United States Patent [19]

Dowler et al.

[11] 4,148,375

[45] Apr. 10, 1979

[54] SEISMIC VIBRATION SOURCE

[75] Inventors: Warren L. Dowler, Sierra Madre; Giulio Varsi, Pasadena; Lien C. Yang, La Canada, all of Calif.

[73] Assignee: The United States of America as represented by the Administrator of the National Aeronautics and Space Administration, Washington, D.C.

[21] Appl. No.: 826,326

[22] Filed: Aug. 22, 1977

[51] Int. Cl.[2] .................................... G01V 1/04
[52] U.S. Cl. ................................ 181/117; 181/106; 102/21.6; 175/1; 166/63
[58] Field of Search ............... 181/106, 113, 116, 117, 181/401; 102/1, 21.6, 25; 175/1; 166/299, 63

[56] References Cited

U.S. PATENT DOCUMENTS

| 968,851 | 8/1910 | Illy | 166/299 |
|---|---|---|---|
| 3,210,897 | 10/1965 | Whittington | 181/21.6 |
| 3,578,008 | 5/1971 | Clark | 102/25 |
| 3,630,284 | 12/1971 | Fast et al. | 102/21.6 |
| 3,670,840 | 6/1972 | Gundlach | 181/117 |
| 3,831,386 | 8/1974 | Phares et al. | 181/119 |
| 4,007,803 | 2/1977 | Airhart | 181/117 |
| 4,042,063 | 8/1977 | Waters | 181/119 |
| 4,051,918 | 10/1977 | Rogers | 181/119 |
| 4,081,031 | 3/1978 | Mohaupt | 102/21.6 |

Primary Examiner—Nelson Moskowitz
Attorney, Agent, or Firm—Monte F. Mott; John R. Manning; Wilfred Grifka

[57] ABSTRACT

A system for vibrating the earth in a location where seismic mapping is to take place, including forming a relatively shallow hole in the earth such as a hole 10 feet deep, placing a solid propellant in the hole, sealing a portion of the hole above the solid propellant with a device that can rapidly open and close to allow a repeatedly interrupted escape of gas, and igniting the propellant so that high pressure gas is created which escapes in pulses to vibrate the earth.

9 Claims, 2 Drawing Figures

SEISMIC VIBRATION SOURCE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a method and apparatus for creating seismic vibrations.

Seismic mapping can be conducted by vibrating the earth in a region to be mapped. One method of vibrating the earth involves the detonation of an explosive such as dynamite, which produces only a single shock. Vibrations at a desired frequency can be produced by a Vibroseis system which includes eccentic weights that are rotated and attached to a heavy platform which is placed on the ground. This system has the advantage that it is relatively safe and enables the production of vibrations of a desired frequency. However, it also has disadvantages in that it involves large capital cost, requires large amounts of power to operate, produces a relatively weak signal such as 10 psi at the vibrator, and is limited to low frequencies of between a few Hz and about 150 Hz. A system which was relatively inexpensive to set up and operate, which was relatively safe, and which produced vibrations of a desired frequency and of considerable magnitude would facilitate the conducting of seismic mapping.

SUMMARY OF THE INVENTION

In accordance with one embodiment of the present invention, a method and apparatus are provided which enable the production of pressure vibrations with large amplitude and at a controlled frequency, and which are relatively safe, inexpensive and compact. The method includes forming a hole in the ground, placing a gas generator, such as solid rocket propellant, in the hole, and sealing the hole with a device that can rapidly open and close to allow the rhythmic escape of gas. The variations of gas pressure in the hole transmit vibrations to the earth.

The novel features of the invention are set forth with particularity in the appended claims. The invention will be best understood from the following description when read in conjunction with the accompanying drawings.

DESCRIPTION OF THE PREFERRED EMBODIMENT

Figure 1:
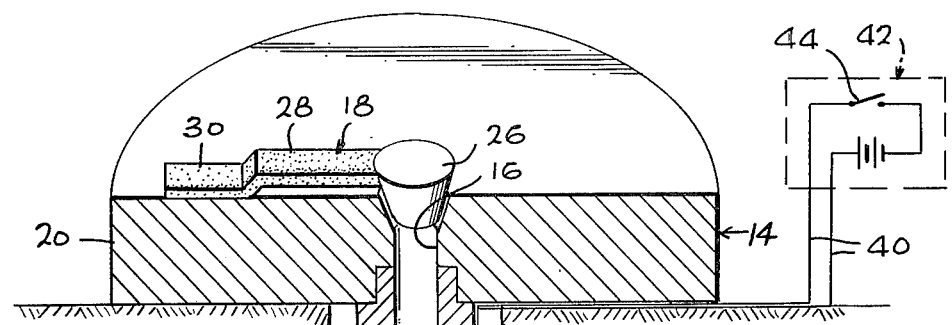
FIG. 1 is a sectional perspective view of a seismic vibration apparatus constructed in accordance with the invention.
Figure 1:
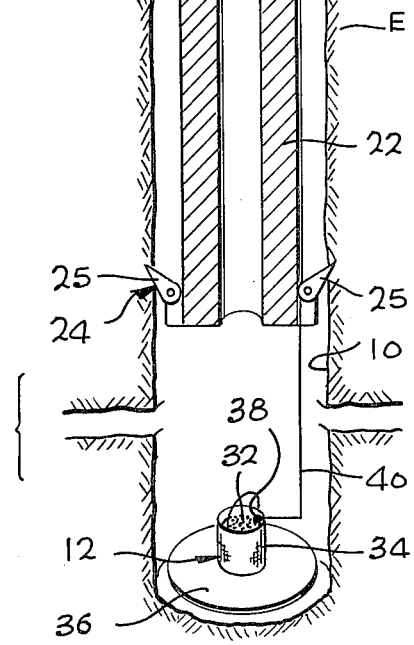

As illustrated in FIG. 1, a method for generating vibrations in the earth E involves the formation of a hole 10 in the earth, the placement of a gas generator 12 in the hole, the placement of a seal 14 over the hole, and the ignition of the gas generator 12. The seal 14 includes an aperture 16 and a mechanism 18 for repeatedly closing and opening the aperture 16 to permit the escape of gas from the hole, in pulses. The high pressure of gas in the hole 10 causes the deflection of the ground away from the center of the hole, while the release of pressure allows the earth to move back towards the center of the hole, and the repeated escape of gas while new gas is being generated results in repeated vibrations of the ground.

The seal 14 includes a heavy base 20 that rests on the ground, and a tube 22 which extends downwardly from the base and into the hole 10 in the earth. An anchoring assembly 24 is attached to the lower end of the tube to anchor it to the walls of the hole 10 in the earth. The anchoring assembly 24 includes several blades 25 extending radially outwardly from the tube and at an upward angle, so that upward forces on the tube tend to dig the blades into the earth and anchor them therein. The anchoring blades 25 are pivotally mounted on the tube, so they can deflect radially inwardly as the tube is being pressed downwardly into the ground during installation. The base 20 is heavy, and its weight helps to keep it down against the upward force of pressured gas in the hole 10, to aid in sealing in the pressured gas.

The vibrating mechanism 18 includes a sealing member 26 which lies over the aperture 16, and an elongated resilient arm 28 which supports the sealing member 26 over the aperture. The arm 28 has one end 30 fixed to the base, and another end fixed to the sealing member 26 and holding it downwardly against the walls of the aperture 16 to tend to seal them. The high pressure of gas in the hole 10 causes the sealing member 26 to deflect the arm 28 upwardly, so that some of the gas escapes. The momentum of the upwardly deflected member 26 carries it higher than necessary to overcome the force of the escaping gas and the gas pressure momentarily decreases, so the resilient arm 28 begins moving the member 26 downwardly to again seal the aperture 16. In this way, the member 26 vibrates up and down at a frequency largely dependent upon the dimensions of the resilient supporting arm 28.

The seismic vibration source can be installed by first drilling a hole 10 in the earth and then installing the gas generator 12. The gas generator includes pellets 32 of solid rocket propellant or a formulation similar to it, which are contained in a basket 34. The propellant includes a mixture of fuel and oxidizer, which enables the rapid production of gas. A support plate 36 can be dropped into the bottom of the hole to support basket 34. An ignition device 38 is located in the propellant, and is connected by wires 40 to an ignition controller 42 at the surface which includes a battery and a switch. The seal 14 can be installed by dropping it onto the ground, with the tube 22 located over the hole 10. Closing of a switch 44 of the ignition device will then begin the generation of gas, which causes the repeated opening and closing of the aperture 16 through which the gas escapes, and the creation of vibrations in the earth. A relief valve (not shown) is provided to prevent excessive pressure that would be unsafe to nearby personnel.

In one system of the invention, the hole 10 can be drilled to a depth of 10 feet, and with a diameter of about six inches or less. Approximately one-half pound of solid rocket propellant can be utilized to produce peak pressures of up to about 2,000 psi.

Figure 2:
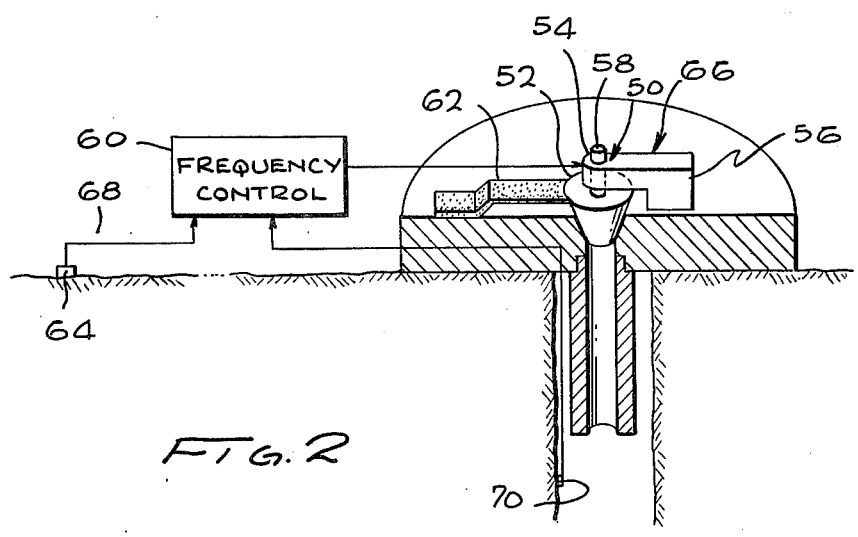
FIG. 2 is a sectional perspective view of a seismic vibration apparatus constructed in accordance with another embodiment of the invention.

FIG. 2 illustrates another vibration source 66 similar to that of FIG. 1, except that an actuator 50 is utilized, which can hold down the sealing member 52 to facilitate the control of the frequency and amplitude of vibrations. The particular actuator 50 which is shown, is a solenoid which includes a coil 54 held by a support 56 over the sealing member, and a slidable core 58 lying against the sealing member. A frequency control circuit 60 supplies pulses of current to the solenoid to alternately hold down the sealing member to prevent escape of gas and release it to allow the escape of gas. Of course, a hydraulic actuator or other means can be used to hold down and release the sealing member. The arm 62 can be thin, since it serves only to hold the sealing member over the aperture in the plate 20.

The frequency control can be set to generate a fixed frequency or predetermined variation such as a chirp (rapid variation of frequency), or can be set to generate a frequency determined by external factors. A geophone 64 is located a distance from the vibration source 66, to sense vibrations in the earth. The geophone can include a circuit which determines the frequency at which the greatest amplitude of vibrations is sensed and control the frequency control circuit 60 to vibrate the sealing member 52 at that frequency when the control circuit is set to respond to the geophone output on line 68.

In order to assure that large amplitude pulses are produced, a pressure transducer 70 can be located to sense the pressure in the hole. The frequency control 60 can be set to limit the frequency of the escaping gas pulses as well as the duration of each pulse as gas pressure decreases, to assure, that large pressures remain in the hole to produce large amplitude vibrations. In this connection, the gas generator can be constructed to generate a variable quantity of gas. For example, a sphere of solid propellant will generate progressively less gas per unit of time, and when the frequency control limits the pulse frequency to maintain a predetermined gas pressure, a progressively decreasing frequency will be produced.

Thus, the invention provides a method and apparatus for generating vibrations for use in seismic mapping. This is accomplished by generating gas in a hole formed in the earth, and allowing the rapid periodic escape of the gas so as to produce the vibrations. A seal that holds in the gas but periodically releases it, can be held to the ground by anchoring a tube in the hole and/or providing a seal which is heavy enough to resist the upward force applied thereto by the gas generator. The gas generator can comprise a formulation similar to a solid rocket propellant, which is relatively safe and easy to handle, and yet which can be provided at relatively low cost. The frequency of vibrations can be controlled by the resiliency of an arm that holds a sealing member, or by a frequency control circuit.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for creating vibrations in the earth, comprising:
   forming a hole in the ground;
   generating large quantities of gas in said hole and allowing the gas to press directly against the walls of the hole; and
   rapidly closing and opening the upper end of said hole, to thereby decrease the force of the gas on the hole walls in pulses.

2. The method described in claim 1 wherein:
   said step of generating gas includes placing a quantity of an igniteable gas-generating chemical in said hole and igniting all of it.

3. A method for creating vibrations in the earth, comprising:
   forming a hole in the ground;
   generating large quantities of gas in said hole; and
   rapidly closing and opening the upper end of said hole to generate vibrations, including anchoring a cover over said hole, said cover having an aperture communicating with said hole, and positioning a resiliently-supported closing member closely over said aperture so it can vibrate against and away from the wall of the aperture.

4. The method described in claim 3 wherein:
   said step of closing and opening includes positioning a tube in the ground with upwardly-angled blades that can dig into the walls of the hole when the tube is pressed up; and
   positioning a movable closing member over the top of the tube to alternately open and close the top of the tube.

5. A method for creating vibrations in the earth, comprising:
   forming a hole in the ground;
   generating large quantities of gas in said hole;
   rapidly closing and opening the upper end of said hole, to thereby generate vibrations; and
   positioning a geophone at a location on the earth which is a distance from said hole;
   said step of rapidly closing and opening including opening said hole at a frequency dependent on the frequency of vibrations sensed by said geophone.

6. A method for creating vibrations in the earth, comprising:
   forming a hole in the ground;
   generating large quantities of gas in said hole;
   rapidly closing and opening the upper end of said hole; and
   sensing the pressure of gas in said hole;
   said step of closing and opening including opening said hole at a frequency dependent on the gas pressure in said hole.

7. Apparatus for creating seismic vibrations in the region of a hole in the ground, comprising:
   gas generating means for generating gas at high pressure in said hole; and
   means for sealing said hole and for rapidly opening and closing said hole to permit the escape of gas in pulses, including a base with an aperture communicating with the hole in the ground, a sealing member which can substantially seal the aperture in said base, and an arm having one end attached to said base and the other end attached to said member and holding said member over said apertue in the base.

8. Apparatus for creating seismic vibrations in the region of a hole in the ground, comprising:
   gas generating means for generating gas at high pressure in said hole;
   means for sealing said hole and for rapidly opening and closing said hole to permit the escape of gas in pulses; and
   a pressure transducer located in said hole, and means responsive to said transducer for controlling said sealing means.

9. Apparatus for creating seismic vibrations in the region of a hole in the ground, comprising:
   gas generating means for generating gas at high pressure in said hole;
   means for sealing said hole and for rapidly opening and closing said hole to permit the escape of gas in pulses; and
   a geophone located a distance from said hole, and means responsive to said geophone for controlling said sealing means.

* * * * *